United States Patent
Zhou et al.

(10) Patent No.: US 10,431,025 B2
(45) Date of Patent: Oct. 1, 2019

(54) PARKING LOCK APPARATUS, PARKING LOCK SYSTEM AND METHOD FOR CONTROLLING THE SAME

(71) Applicant: BOE TECHNOLOGY GROUP CO., LTD., Beijing (CN)

(72) Inventors: Zhigang Zhou, Beijing (CN); Liang Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/936,080

(22) Filed: Mar. 26, 2018

(65) Prior Publication Data

US 2019/0114855 A1 Apr. 18, 2019

(30) Foreign Application Priority Data

Oct. 12, 2017 (CN) .......................... 2017 1 0949050

(51) Int. Cl.
*G07C 9/00* (2006.01)
*E05B 65/00* (2006.01)
*H04B 5/00* (2006.01)
*H04L 29/08* (2006.01)

(52) U.S. Cl.
CPC ...... *G07C 9/00182* (2013.01); *E05B 65/0007* (2013.01); *G07C 9/00896* (2013.01); *G06Q 2240/00* (2013.01); *H04B 5/0025* (2013.01); *H04L 67/10* (2013.01)

(58) Field of Classification Search
CPC .......................... G07C 9/00182; G07C 9/00896
USPC ......................................................... 340/5.6
See application file for complete search history.

(56) References Cited

U.S. PATENT DOCUMENTS

| | | | | |
|---|---|---|---|---|
| 6,559,775 B1* | 5/2003 | King | ....................... | E05F 15/40 340/10.1 |
| 8,742,949 B2* | 6/2014 | Chang | ................... | E01F 13/046 340/5.7 |
| 2012/0284209 A1* | 11/2012 | Duffy | ..................... | G07B 15/02 705/418 |

FOREIGN PATENT DOCUMENTS

| | | |
|---|---|---|
| CN | 201322949 Y | 10/2009 |
| CN | 201638276 U | 11/2010 |
| CN | 103437583 A | 12/2013 |
| CN | 103856500 A | 6/2014 |
| CN | 104246094 A | 12/2014 |
| CN | 105239814 A | 1/2016 |
| CN | 205405920 U | 7/2016 |
| CN | 205591618 U | 9/2016 |
| CN | 205662872 U | 10/2016 |
| CN | 106088750 A | 11/2016 |
| CN | 106157402 A | 11/2016 |
| CN | 205676802 U | 11/2016 |
| CN | 106499237 A | 3/2017 |

(Continued)

OTHER PUBLICATIONS

First Office Action for Chinese Application No. 201710949050.8, dated Mar. 27, 2019, 7 Pages.

*Primary Examiner* — Vernal U Brown
(74) *Attorney, Agent, or Firm* — Brooks Kushman P.C.

(57) ABSTRACT

A parking lock apparatus, a parking lock system and a method for controlling the same are provided. The method includes: identifying identity information of a to-be-parked vehicle, sending an unlocking command to a parking lock according to the identified identity information and enabling the parking lock to be unlocked according to the unlocking command.

15 Claims, 7 Drawing Sheets

(56) References Cited

FOREIGN PATENT DOCUMENTS

CN 106088750 B 9/2018

\* cited by examiner

PARKING LOCK APPARATUS, PARKING LOCK SYSTEM AND METHOD FOR CONTROLLING THE SAME

CROSS-REFERENCE TO RELATED APPLICATION

This application claims priority to Chinese Patent Application No. 201710949050.8 filed on Oct. 12, 2017, which is incorporated herein by reference in its entirety.

TECHNICAL FIELD

The present disclosure relates to the field of parking lock control technology, and in particular to a parking lock apparatus, a parking lock system and a method for controlling the same.

BACKGROUND

A parking lock apparatus for vehicles has a tripod-shaped locking pattern and a flat-type unlocking pattern, and may be installed in a private parking space.

After a user drives a vehicle out of the private parking space, in order to prevent others from occupying the private parking space, the user needs to get off the vehicle, adjust the parking lock apparatus from the flat-type unlocking pattern to the tripod-shaped unlocking pattern and then locks the tripod-shaped parking lock apparatus. When the user returns and needs to park the vehicle in the private parking space, the user needs to first get off the vehicle, unlock the tripod-shaped parking lock apparatus, manually adjust the parking lock apparatus from the unlocking pattern to the unlocking pattern, and then drives the vehicle into the private parking space. Thus, the private parking lock apparatus may be privately used by the user with a key to the parking lock apparatus.

SUMMARY

According to one aspect, one embodiment of the present disclosure provides a method for controlling a parking lock apparatus including: identifying identity information of a to-be-parked vehicle, sending an unlocking command to a parking lock according to the identified identity information and enabling the parking lock to be unlocked according to the unlocking command.

Optionally, the method further includes: establishing a communication connection with the to-be-parked vehicle, identifying a running state of the to-be-parked vehicle, sending a locking command to the parking lock when the running date is a closed state, and enabling the parking lock to be locked according to the locking command.

Optionally, the enabling the parking lock to be locked according to the locking command includes: according to the received locking command, using a distance detection device of the parking lock on the ground to measure a spacing distance between a vehicle chassis of the to-be-parked vehicle and the distance detection device, controlling a lifting height of a lock body of the parking lock according to the spacing distance, and enabling a distance between the vehicle chassis of the to-be-parked vehicle and the distance detection device to reach a preset distance.

Optionally, the method further includes sending a parking fee message to the to-be-parked vehicle when the running state is changed from the closed state to the starting state, sending the unlocking command to the parking lock according to the received parking fee message, and enabling the parking lock to be unlocked according to the unlocking command.

Optionally, the closed state is a state in which an engine of the to-be-parked vehicle is closed; and the starting state is a state in which the engine starts.

Optionally, before the establishing a communication connection with the to-be-parked vehicle, the method further includes: determining a type of the identity information of the to-be-parked vehicle. The establishing a communication connection with the to-be-parked vehicle includes: establishing a communication connection with the to-be-parked vehicle when the type of the identity information of the to-be-parked vehicle is a timely charge type.

Optionally, the sending an unlocking command to a parking lock according to the identified identity information and enabling the parking lock to be unlocked according to the unlocking command includes: comparing the identity information of the to-be-parked vehicle with a vehicle identity information database which stores certified identity information of vehicles in advance, sending the unlocking command to the parking lock when the identity information of the to-be-parked vehicle matches one of pieces of certified identity information in the vehicle identity information database, and enabling the parking lock to be unlocked according to the unlocking command.

Optionally, the sending the unlocking command to the parking lock when the identity information of the to-be-parked vehicle matches one of pieces of certified identity information in the vehicle identity information database includes: when the certified identity information includes first identity information and second identity information, sending the unlocking command to the parking lock when the identified identity information is the first identity information and it is in a first time period.

Optionally, the first identity information is secondary identity information, and the second identity information is primary identity information; vehicles corresponding to the secondary identity information use the parking lock in a first time period, and vehicles correspond to the primary identity information use the parking lock in any time.

Optionally, the sending the unlocking command to the parking lock when the identity information of the to-be-parked vehicle matches one of pieces of certified identity information in the vehicle identity information database includes: sending the unlocking command to the parking lock when the identified identity information is the second identity information.

Optionally, the sending an unlocking command to a parking lock according to the identified identity information and enabling the parking lock to be unlocked according to the unlocking command includes: sending identity information of the to-be-parked vehicle to a vehicle identity information database, storing the identity information of the to-be-parked vehicle to the vehicle identity information database, sending the unlocking command to the parking lock, and enabling the parking lock to be unlocked according to the unlocking command.

According to another aspect, one embodiment of the present disclosure provides a parking lock apparatus including: a vehicle identification device configured to identify identity information of a to-be-parked vehicle; and a parking lock controlling device configured to send an unlocking command to a parking lock according to the identified identity information.

Optionally, the parking lock apparatus further includes a communication device configured to establish a communication connection with the to-be-parked vehicle. The parking lock controlling device is coupled to the communication device; the parking lock controlling device is further configured to identify a running state of the to-be-parked vehicle, send the locking command to the parking lock when the running date is a closed state, and enable the parking lock to be locked according to the locking command.

Optionally, the parking lock includes a lock body, a driving device for driving the lock body to move upwardly or downwardly, a control device, and a distance detection device. The control device is electrically coupled to the distance detection device and the driving device, respectively. The parking lock controlling device is electrically coupled to the control device and the vehicle identification device, respectively.

Optionally, the distance detection device is on the lock body.

Optionally, the driving device includes a cylinder body disposed on a base, and the distance detection device is disposed at the base.

According to another aspect, one embodiment of the present disclosure provides a parking lock system including at least one parking lock apparatus and a remote service device in communication connection with the at least one parking lock apparatus. The parking lock apparatus includes a vehicle identification device configured to identify identity information of a to-be-parked vehicle, and a parking lock controlling device configured to send an unlocking command to a parking lock according to the identified identity information.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Detailed description of the exemplary embodiments will be made herein, with examples thereof to be shown in drawings. In the following descriptions, when the drawings are referred to, unless expressed otherwise, the same number in different drawings refers to the same or similar elements. The embodiments described in the exemplary embodiments as below do not represent all embodiments that are consistent with the present disclosure. On the contrary, they are only examples of the devices and the methods that are consistent with some of the aspects of the present disclosure as recited in the claims.

A method for controlling a parking lock apparatus provided in some embodiments of the present disclosure includes: first identifying identity information of a vehicle, and automatically unlocking a parking lock after the identity information of the vehicle is identified. Thus the method is convenient for users.

Figure 1:
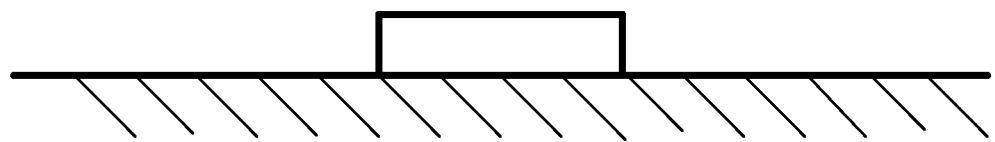
FIG. 1 is a schematic diagram of a parking lock when the parking lock is at an unlocking pattern according to a method for controlling a parking lock apparatus provided in some embodiments of the present disclosure.
Figure 2:
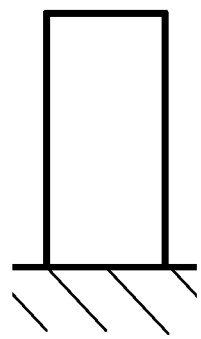
FIG. 2 is a schematic diagram of the parking lock when the parking lock is at a locking pattern according to the method for controlling the parking lock apparatus provided in some embodiments of the present disclosure.
Figure 3:
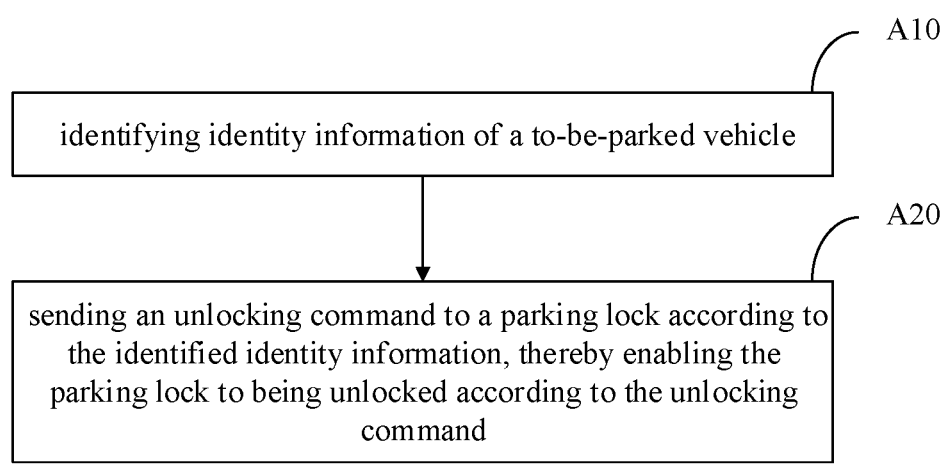
FIG. 3 is a flowchart of a method for controlling a parking lock apparatus provided in some embodiments of the present disclosure.

FIG. 1 to FIG. 3 show one embodiment of a method for controlling a parking lock apparatus provided in some embodiments of the present disclosure. Referring to FIG. 1 to FIG. 3, the method may be applied to one parking lock apparatus which has an unlocking pattern (as shown in FIG. 1) after receiving an unlocking command and a locking pattern (as shown in FIG. 2) after receiving a locking command. A parking lock of the parking lock apparatus may be normally at the locking pattern or the unlocking pattern. Referring to FIG. 3, the method includes the following steps A10 and A20.

The step A10 is to identify identity information of a to-be-parked vehicle.

The to-be-parked vehicle is provided with an identity information identification component. The identity information identification component contains the identity information of the to-be-parked vehicle. The identity information of the to-be-parked vehicle can be obtained by collecting information of the identity information identification component. Specifically, the identity information identification component may include one of a license plate number, a radio frequency identification (RFID) chip and a two-dimensional code.

The step A20 is to send an unlocking command to a parking lock according to the identified identity information, thereby enabling the parking lock to be unlocked according to the unlocking command.

Rules for sending an unlocking command to a parking lock according to the identified identity information may be set according to actual needs, and may be varied in different scenarios. The unlocking command may be sent to the parking lock in a wired or wireless manner. After receiving the unlocking command, the parking lock can automatically be unlocked.

According to the method, the identity information of the to-be-parked vehicle is first identified to obtain the identity information of the to-be-parked vehicle, and the parking lock is controlled to be automatically unlocked according to the identified identity information. Comparing with the related art, in the process of unlocking the parking lock, no person needs to get off the vehicle to unlock the parking lock since the parking lock can automatically be unlocked according to the identified identity information. Thus the method is convenient for users.

Figure 4:
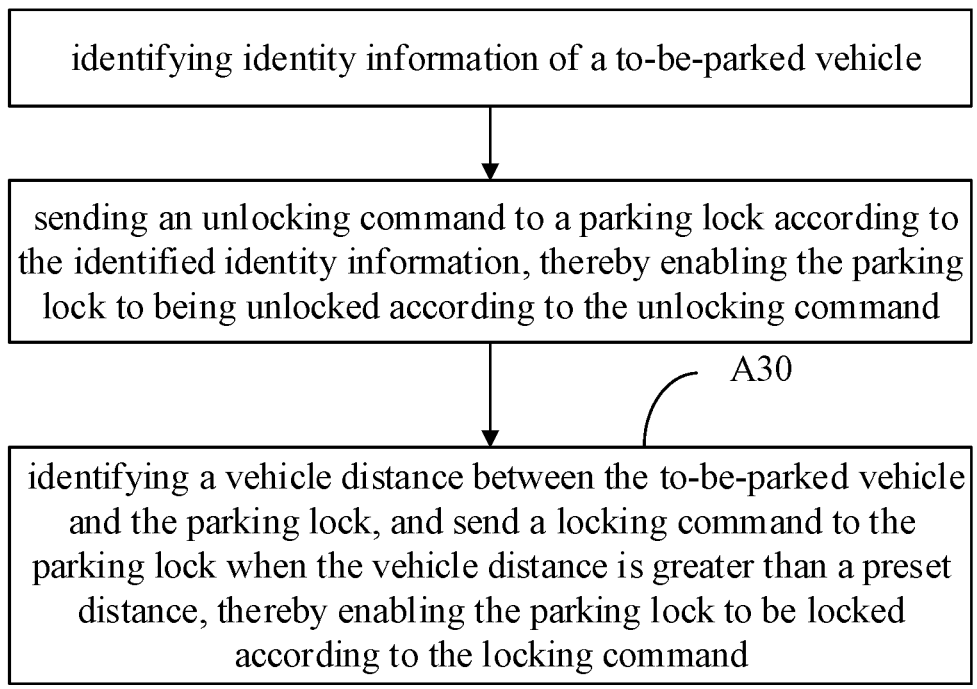
FIG. 4 is another flowchart of a method for controlling a parking lock apparatus provided in some embodiments of the present disclosure.

Specifically, as shown in FIG. 4, the above method may further include the following step A30.

The step A30 is to identify a vehicle distance between the to-be-parked vehicle and the parking lock, and send a locking command to the parking lock when the vehicle distance is greater than a preset distance, thereby enabling the parking lock to be locked according to the locking command.

The vehicle distance may be identified by a near field communication (NFC) device disposed in the to-be-parked vehicle or by using a camera to identify a position of the vehicle. After the vehicle leaves away from a parking space, the parking lock is controlled to be locked, thereby preventing an unidentified vehicle from entering into the parking space.

Figure 5:
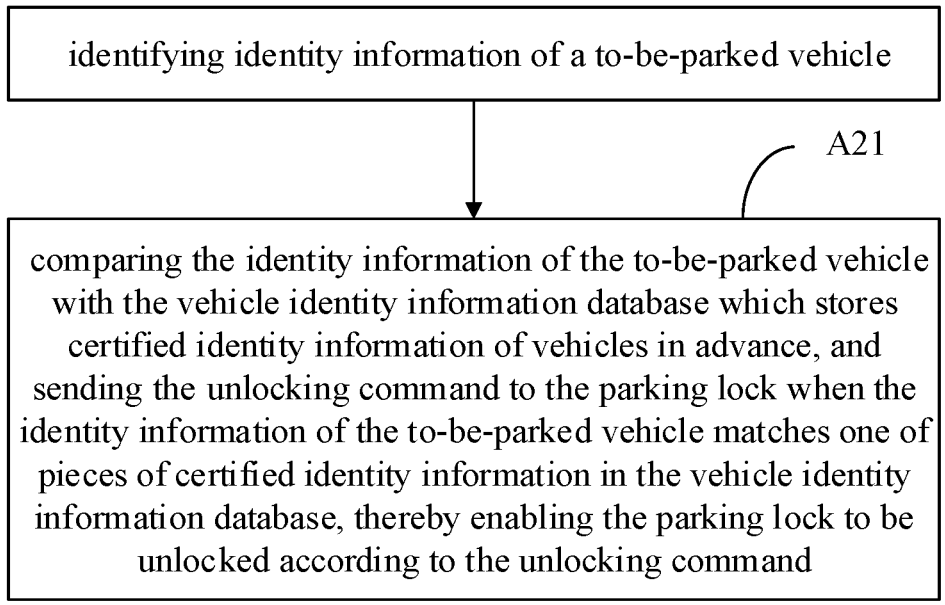
FIG. 5 is still another flowchart of a method for controlling a parking lock apparatus provided in some embodiments of the present disclosure.

The method may be applied to specific user groups. For example, parking locks in company parking spaces or residential parking spaces may be unlocked only for certified users, and certified identity information of vehicles may be stored in advance in a vehicle identity information database. In application, as shown in FIG. 5, the above step A20 may include the following step A21.

The step A21 is to compare the identity information of the to-be-parked vehicle with the vehicle identity information database which stores the certified identity information of vehicles in advance, and send the unlocking command to the parking lock when the identity information of the to-be-parked vehicle matches one of pieces of certified identity information in the vehicle identity information database, thereby enabling the parking lock to be unlocked according to the unlocking command.

The vehicle identity information database may store in advance one piece of identity information of one vehicle, then the parking lock is unlocked only for a single user and thus is suitable for private use. The vehicle identity information database may store in advance at least two pieces of identity information of vehicles, and then the parking lock is unlocked for several users, i.e., the several users use one parking lock.

Figure 6:
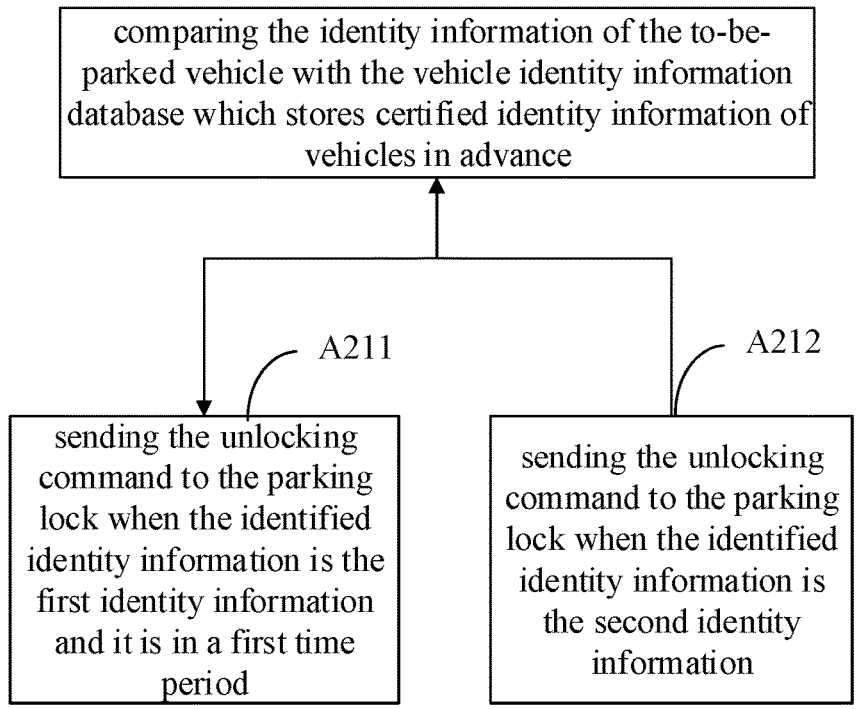
FIG. 6 is a yet another flowchart of a method for controlling a parking lock apparatus provided in some embodiments of the present disclosure.

In actual application, one vehicle may have two pieces of identity information. The certified identity information of one vehicle pre-stored in the vehicle identity information database may include primary identity information and secondary identity information. The primary identity information corresponds to one or more vehicles, and the secondary identity information corresponds to one or more vehicles. One or more vehicles corresponding to the primary identity information and one or more vehicles corresponding to the secondary identity information may be allocated with time periods for using the parking lock according to settings. In application, as shown in FIG. 6, the sending the unlocking command to the parking lock when the identity information of the to-be-parked vehicle matches one of pieces of certified identity information in the vehicle identity information database in the above step A21 may include the following steps A211 and A212.

The step A211 is to, when pre-stored certified identity information of each vehicle includes first identity information and second identity information, send the unlocking command to the parking lock when the identified identity information is the first identity information and it is in a first time period.

The first identity information is the secondary identity information, and the second identity information is the primary identity information. Vehicles corresponding to the secondary identity information can use the parking lock in a specific time period, and vehicles correspond to the primary identity information can use the parking lock in any time. For example, when one vehicle correspond to the primary identity information is driven out during the day time and is not in the parking space, then the first time period may be set to be the day time, for example, 9:00 a.m. to 6:00 p.m. The vehicles corresponding to the secondary identity information may be allowed to use the parking lock only in the first time period, thereby not affecting parking of the vehicle correspond to the primary identity information at night.

The step A212 is to send the unlocking command to the parking lock when the identified identity information is the second identity information.

The vehicles correspond to the primary identity information can use the parking lock in any time.

Figure 7:
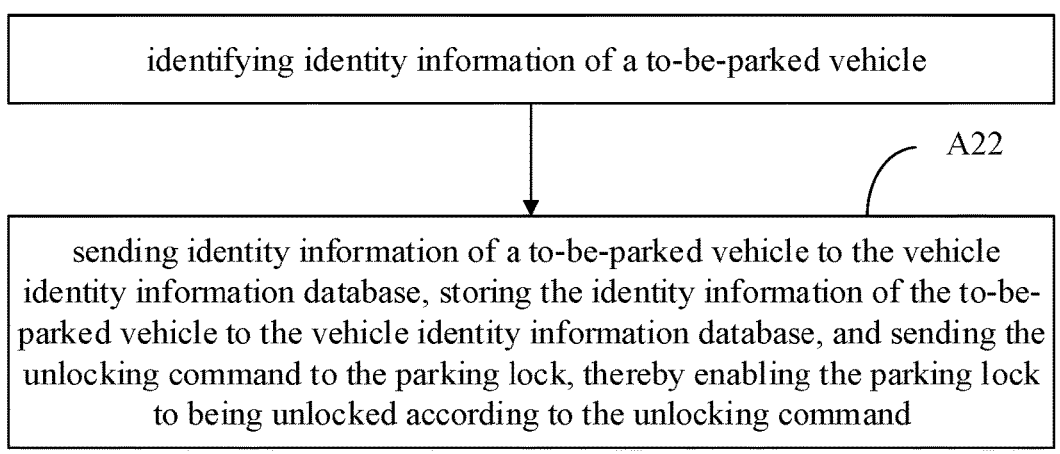
FIG. 7 is still yet another flowchart of a method for controlling a parking lock apparatus provided in some embodiments of the present disclosure.

The method may be applied to public places such as parks and playgrounds for all users, and parking locks may be unlocked for all used and identified identity information of vehicles can be directly store in the vehicle identity information database. In application, as shown in FIG. 7, the above step A20 may include the following step A22.

The step A22 is to send identity information of the to-be-parked vehicle to the vehicle identity information database, store the identity information of the to-be-parked vehicle to the vehicle identity information database, and send the unlocking command to the parking lock, thereby enabling the parking lock to be unlocked according to the unlocking command.

A registration system may be adopted when using the parking lock. For example, before one vehicle enters one parking space, the identity information of the vehicle is first identified and then stored in the vehicle identity information database, and then the parking lock is controlled to be unlocked, thereby recording vehicles entering the parking space.

In one embodiment, after the identity information of the vehicle is identified and then the parking lock is unlocked, for a toll area, when one vehicle enters the parking space, the parking lock may be controlled to be locked, thereby controlling the vehicle in the parking space, preventing the vehicle from being driven away without payment and then facilitating management of the parking space.

Figure 8:
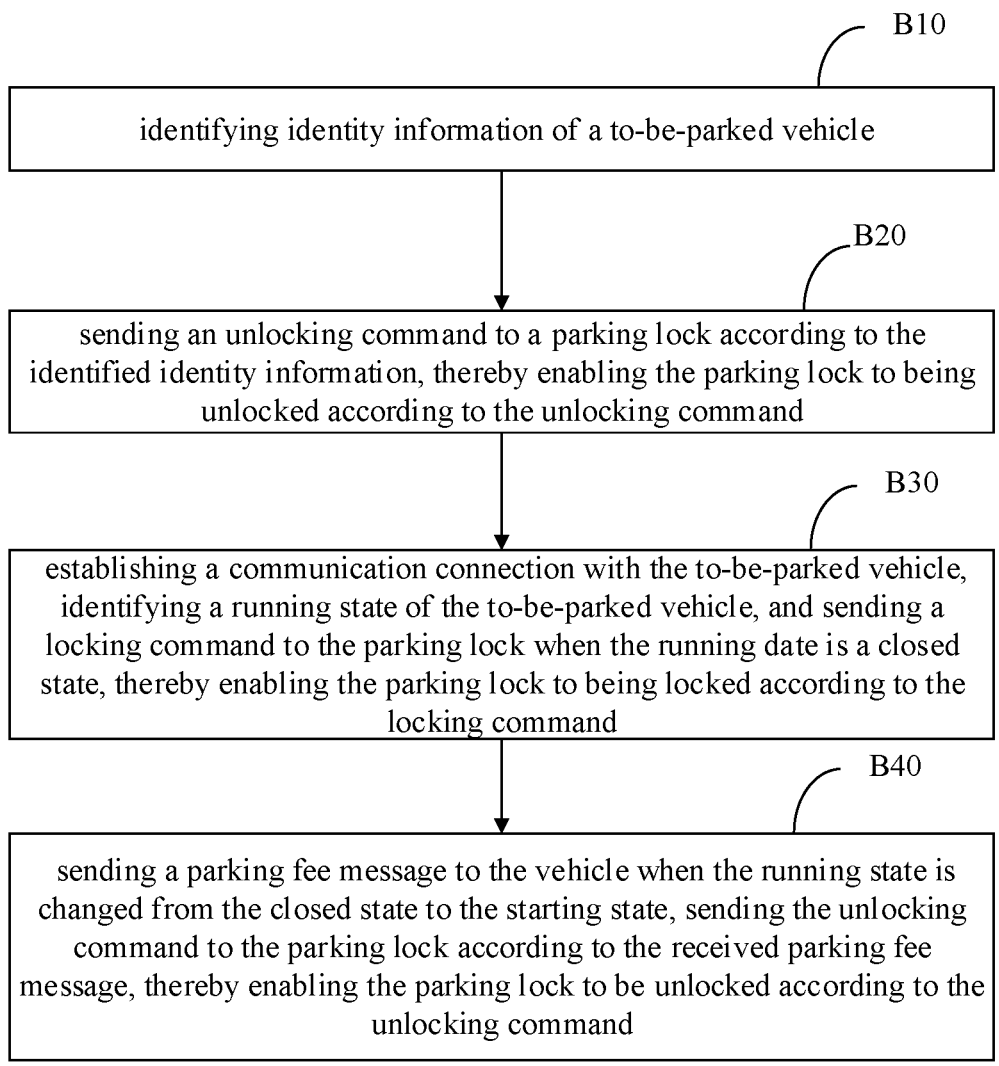
FIG. 8 is still yet another flowchart of a method for controlling a parking lock apparatus provided in some embodiments of the present disclosure.

FIG. 8 shows one embodiment of a method for controlling a parking lock apparatus provided in some embodiments of the present disclosure. Referring to FIG. 8, the method includes the following steps B10 to B30.

The step B10 is to identify identity information of a to-be-parked vehicle.

The to-be-parked vehicle is provided with an identity information identification component. The identity information identification component contains the identity information of the to-be-parked vehicle. The identity information of the to-be-parked vehicle can be obtained by collecting information of the identity information identification component. Specifically, the identity information identification component may include one of a license plate number, a radio frequency identification (RFID) chip and a two-dimensional code.

The step B20 is to send an unlocking command to a parking lock according to the identified identity information, thereby enabling the parking lock to be unlocked according to the unlocking command.

Rules for sending an unlocking command to a parking lock according to the identified identity information may be set according to actual needs, and may be varied in different scenarios. The unlocking command may be sent to the parking lock in a wired or wireless manner. After receiving the unlocking command, the parking lock can automatically be unlocked.

The step B30 is to establish a communication connection with the to-be-parked vehicle, identify a running state of the to-be-parked vehicle, and send a locking command to the parking lock when the running date is a closed state, thereby enabling the parking lock to be locked according to the locking command.

The communication connection with the to-be-parked vehicle may be established in a wireless manner. For example, the communication connection with the to-be-parked vehicle may be established through a near field communication (NFC) device. The running state of the to-be-parked vehicle may be identified by establishing a communication connection with a central control system of the vehicle. The running state of the vehicle includes a starting state and a closed state. The starting state may refer to a state in which an engine of the vehicle starts. The closed state may refer to a state in which the engine of the vehicle is closed. It should be understood that, in actual application, the starting state and the closed state are not limited to states of the engine and may refer to other states, for example, the starting state may refer to a state where a handbrake of the vehicle is not locked, and the closed state may refer to a state where the handbrake of the vehicle is locked.

In this embodiment, the parking lock is controlled to be locked by identifying the running state of the vehicle, thereby enabling the parking lock to lock the vehicle in the parking space, preventing the vehicle from being driven away without payment and then improving reliability of self-service management of the parking lock.

Figure 9:
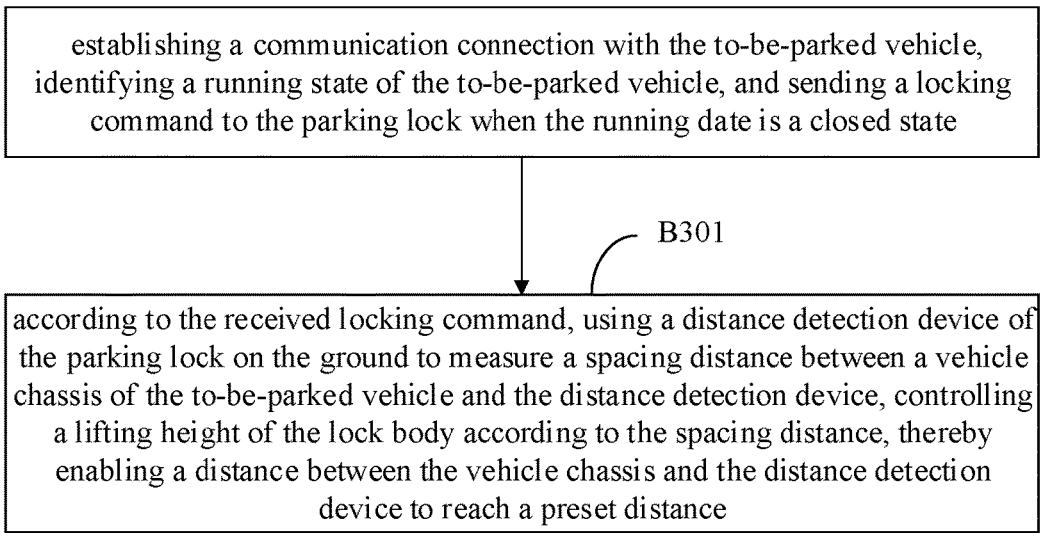
FIG. 9 is still yet another flowchart of a method for controlling a parking lock apparatus provided in some embodiments of the present disclosure.

Locking of the parking lock may be realized by controlling a lock body of the parking lock to move upwardly. For example, the lock body may be disposed at an entrance of the parking space, and the lock body may move upwardly after the vehicle enters the parking space, thereby preventing the vehicle from being driven away from the entrance. In actual application, for one parking space for all users, it may be difficult to prevent the vehicle from being driven away by the lock body at an entrance. In one embodiment, as shown in FIG. 9, the enabling the parking lock to be unlocked according to the unlocking command includes the following step B301.

The step B301 is to, according to the received locking command, use a distance detection device of the parking lock on the ground to measure a spacing distance between a vehicle chassis of the to-be-parked vehicle and the distance detection device, control a lifting height of the lock body of the parking lock according to the spacing distance, thereby enabling a distance between the vehicle chassis of the to-be-parked vehicle and the distance detection device to reach a preset distance.

The lock body of the parking lock may be disposed at a middle portion of the parking space. After the vehicle enters the parking space, the lock body of the parking lock is just under the vehicle chassis. The spacing distance between the vehicle chassis and the parking lock is first measures. The measured spacing distance may be varied with vehicles of different chassis heights. The lifting height of the lock body of the parking lock is controlled according to the spacing distance until the distance between the vehicle chassis and the distance detection device reaches the preset distance. The preset distance may be set according to needs, thereby enabling the parking lock to be suitable for vehicles of different types and realizing controlling of the parking lock in the parking space for all users.

When the driver returns back to the parking space, the driver needs to pay the parking fee in accordance with regulations. After the driver pays the parking fee to a manager, the manager may control the parking lock to be unlocked so that the vehicle can be driven away from the parking space. In actual application, in order to realize automatic controlling of the parking lock, as shown in FIG. 8, the above method further includes the following step B40.

The step B40 is to, send a parking fee message to the vehicle when the running state is changed from the closed state to the starting state, send the unlocking command to the parking lock according to the received parking fee message, thereby enabling the parking lock to be unlocked according to the unlocking command.

After identifying the running state of the vehicle, when the running state of the vehicle is changed from the closed state to the starting state, the parking lock apparatus determines that the driver returns back to the parking space, and calculates the parking fee. The parking fee may be calculated according to a time interval at which the running state of the vehicle is changed from the closed state to the starting state, or may be directly generated based on a unified price. The parking fee may be may be transmitted to a central control screen of the vehicle. When the driver enters the vehicle, the driver may view the parking fee at the central control screen and pays the parking fee. After the fee corresponding to the parking fee is received by a parking lock system, the parking lock system generates a payment confirmation message. The parking lock can be automatically unlocked according to the payment confirmation message, thereby realizing unmanned charge management.

In one embodiment of the method, after the identity information of the vehicle is identified and then the parking lock is unlocked, for the toll area, the parking lock may be controlled to be locked for vehicles of a timely charge type, thereby preventing the vehicles of the charge type from being driven away without payment. The parking lock is not needed to be locked for vehicles of a non-charge type or an annual fee type. Thus, the method facilitates management of vehicles of different types at the parking space.

Figure 10:
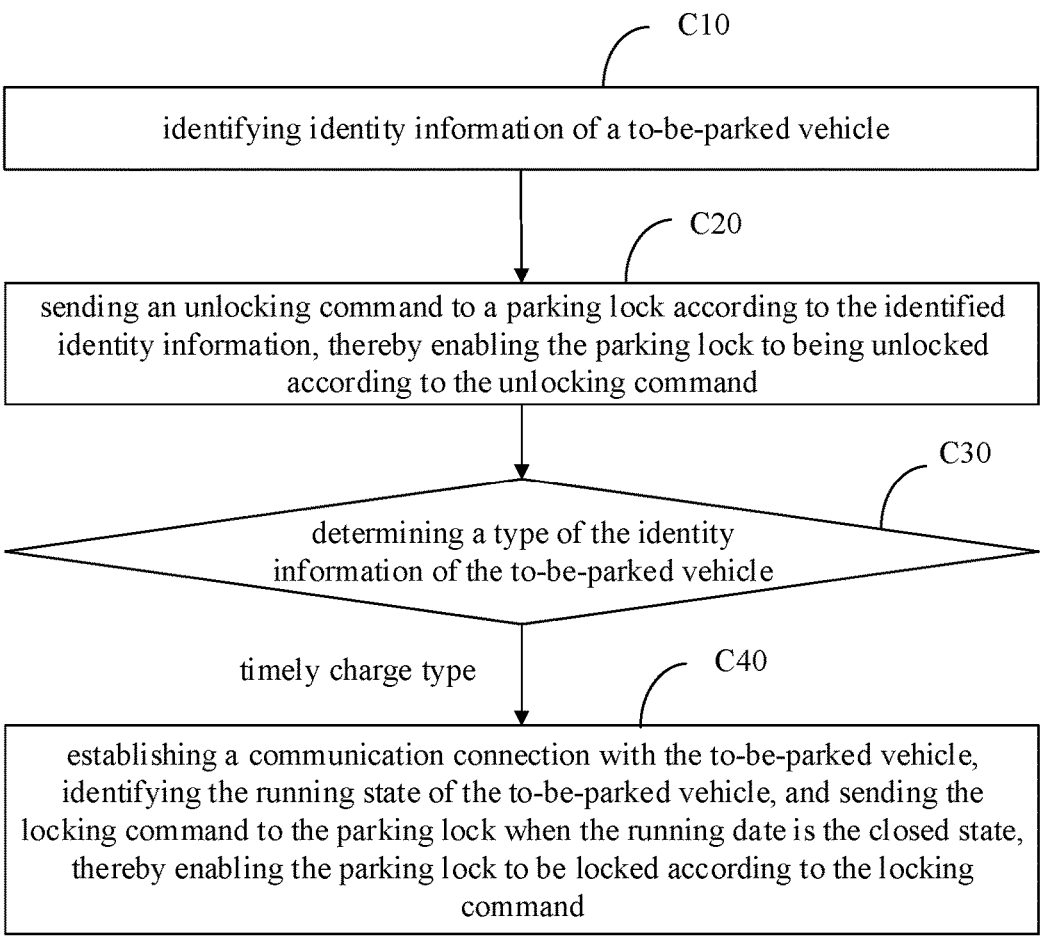
FIG. 10 is still yet another flowchart of a method for controlling a parking lock apparatus provided in some embodiments of the present disclosure.

FIG. 10 shows one embodiment of a method for controlling a parking lock apparatus provided in some embodiments of the present disclosure. Referring to FIG. 10, the method includes the following steps C10 to C40.

The step C10 is to identify identity information of a to-be-parked vehicle.

The to-be-parked vehicle is provided with an identity information identification component. The identity information identification component contains the identity information of the to-be-parked vehicle. The identity information of the to-be-parked vehicle can be obtained by collecting information of the identity information identification component. Specifically, the identity information identification component may include one of a license plate number, a radio frequency identification (RFID) chip and a two-dimensional code.

The step C20 is to send an unlocking command to a parking lock according to the identified identity information, thereby enabling the parking lock to be unlocked according to the unlocking command.

Rules for sending an unlocking command to a parking lock according to the identified identity information may be set according to actual needs, and may be varied in different scenarios. The unlocking command may be sent to the parking lock in a wired or wireless manner. After receiving the unlocking command, the parking lock can automatically be unlocked.

The step C30 is to determine a type of the identity information of the to-be-parked vehicle.

The step C40 is to, when the type of the identity information of the to-be-parked vehicle is a timely charge type, establish a communication connection with the to-be-parked vehicle, identify the running state of the to-be-parked vehicle, and send the locking command to the parking lock when the running date is the closed state, thereby enabling the parking lock to be locked according to the locking command.

when the type of the identity information of the to-be-parked vehicle is a non-charge type, the parking lock is not needed to be locked.

By dividing identity information of vehicles into types, vehicles of different types can be managed differently, thereby reducing the number of times of state transformation of the parking lock and then improving the service life of the parking lock.

A parking lock apparatus is provided in some embodiments of the present disclosure. The parking lock apparatus may first identify identity information of a vehicle, and then automatically unlock a parking lock after the identity information of the vehicle is identified. Thus the parking lock apparatus is convenient for users.

Figure 11:
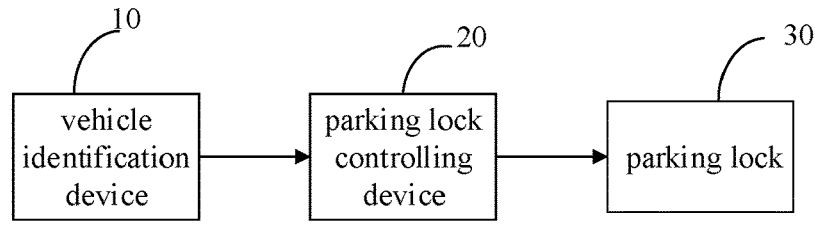
FIG. 11 is a schematic diagram of a parking lock apparatus provided in some embodiments of the present disclosure.

FIG. 11 shows one embodiment of the parking lock apparatus provided in some embodiments of the present disclosure. Referring to FIG. 11, the parking lock apparatus has an unlocking pattern after receiving an unlocking command and a locking pattern after receiving a locking command. The parking lock apparatus may include a vehicle identification device 10 and a parking lock controlling device 20.

The vehicle identification device 10 is to identify identity information of a to-be-parked vehicle.

The parking lock controlling device 20 is to send an unlocking command to a parking lock 30 according to the identified identity information.

According to the parking lock apparatus, the identity information of the to-be-parked vehicle is first identified to obtain the identity information of the to-be-parked vehicle, and the parking lock is controlled to be automatically unlocked according to the identified identity information. Comparing with the related art, in the process of unlocking the parking lock, no person needs to get off the vehicle to unlock the parking lock since the parking lock can automatically be unlocked according to the identified identity information. Thus the method is convenient for users.

Figure 12:
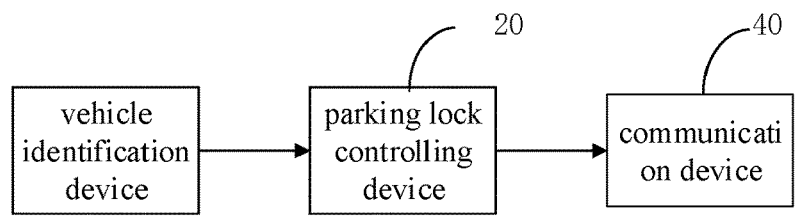
FIG. 12 is another schematic diagram of a parking lock apparatus provided in some embodiments of the present disclosure.

Further, as shown in FIG. 12, the above parking lock apparatus further includes a communication device 40 that is to establish a communication connection with the to-be-parked vehicle.

The parking lock controlling device 20 is coupled to the communication device 40. The parking lock controlling device 20 is further used to identify a running state of the to-be-parked vehicle, and send the locking command to the parking lock when the running date is a closed state, thereby enabling the parking lock to be locked according to the locking command.

Figure 13:
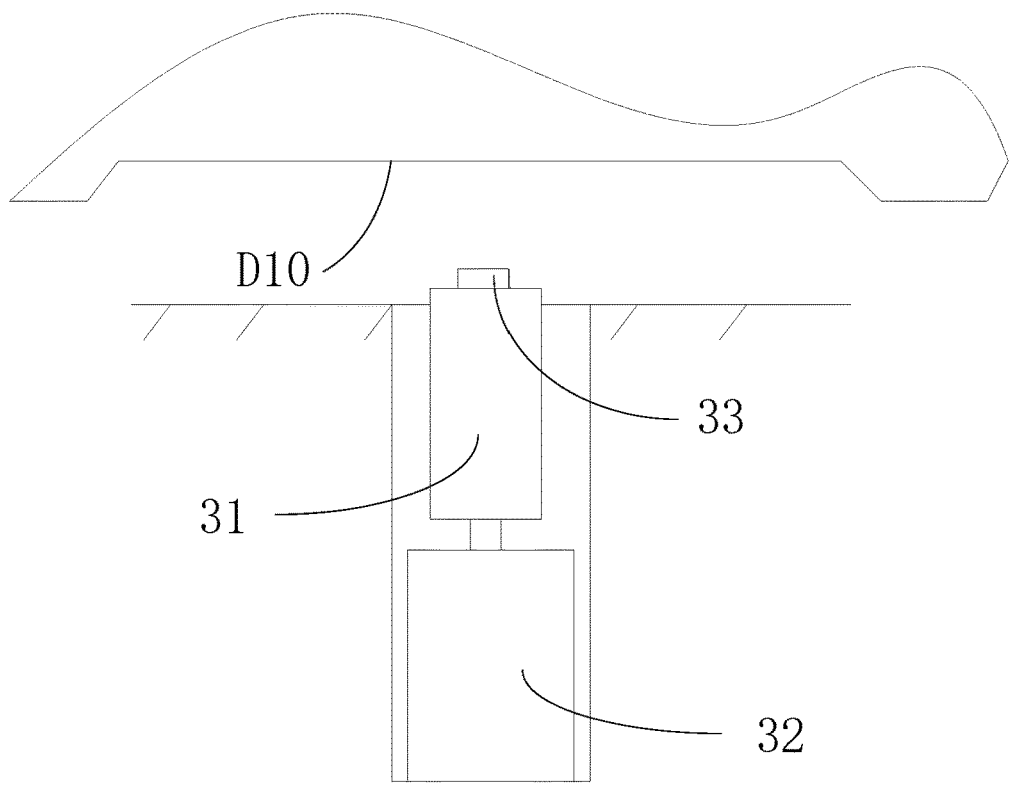
FIG. 13 is a schematic diagram of a parking lock of a parking lock apparatus when the parking lock is at a parking position provided in some embodiments of the present disclosure.

In one embodiment, as shown in FIG. 13, the parking lock includes a lock body 31, a driving device 32 for driving the lock body to move upwardly or downwardly, a control device, and a distance detection device 33. The control device is electrically coupled to the distance detection device 33 and the driving device 32, respectively. The parking lock controlling device 20 is electrically coupled to the control device and the vehicle identification device 10, respectively. The driving device 32 may employ a hydraulic driver or an electric push rod.

In application, the lock body 31 may be disposed at a middle portion of the parking space. After the vehicle enters the parking space, the lock body 31 is under the vehicle chassis D10. After the vehicle enters the parking space, the parking lock is needed to be changed to the locking pattern. Then, the distance detection device 33 first measures the height of the vehicle chassis D10, i.e., a spacing distance between the vehicle chassis D10 and the distance detection device 33 is measured. A lifting height of the lock body 31 is controlled according to the spacing distance so that the lock body 31 is adjacent the vehicle chassis D10 until the vehicle is locked to the parking space. In one specific embodiment, the distance detection device 33 may be disposed on the lock body 31. When the lock body 31 moves upwardly, the distance detection device 33 can measure in time the spacing distance between the vehicle chassis D10 and the distance detection device 33 until the measure distance reaches a preset value, and then the control device sends a command for stopping moving upwardly, and the driving device stops driving the lock body to move upwardly.

Figure 14:
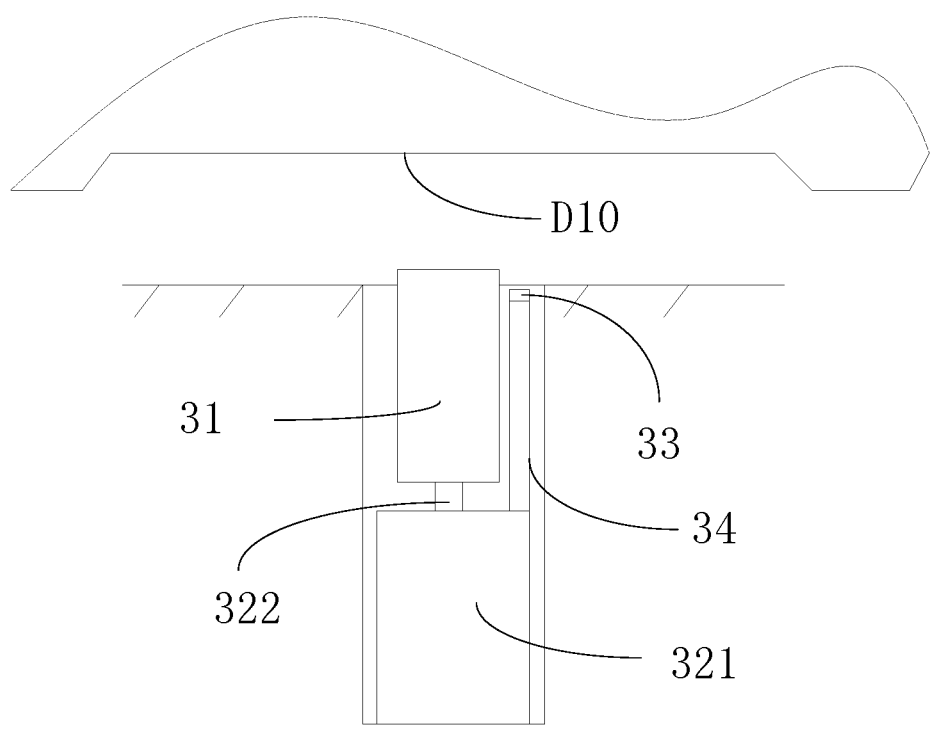
FIG. 14 is another schematic diagram of a parking lock of a parking lock apparatus when the parking lock is at a parking position provided in some embodiments of the present disclosure.

In another embodiment, the distance detection device 33 may be disposed at other positions rather than the lock body. As shown in FIG. 14, the driving device includes a cylinder body 321 and a push rod 322 for driving the lock body. The cylinder body 321 is disposed at a base 34. The distance detection device 33 may be disposed at the base 34 and does not move upwardly along the upward movement of the cylinder body 321. After the distance detection device 33 measures the spacing distance between the vehicle chassis D10 and the distance detection device 33, a lifting distance of the lock body 31 may be controlled according to a difference of heights of the distance detection device 33 and the lock body 31 as well as differences of measured spacing distances. As a result, the lock body 31 can move upwardly to a position where the spacing distance between the vehicle chassis D10 and the distance detection device 33 reaches the preset distance.

A parking lock system is provided in some embodiments of the present disclosure. The parking lock system includes a parking lock apparatus which may first identify identity information of a vehicle and then automatically unlock a parking lock after the identity information of the vehicle is identified. Thus the parking lock system is convenient for users.

Figure 15:
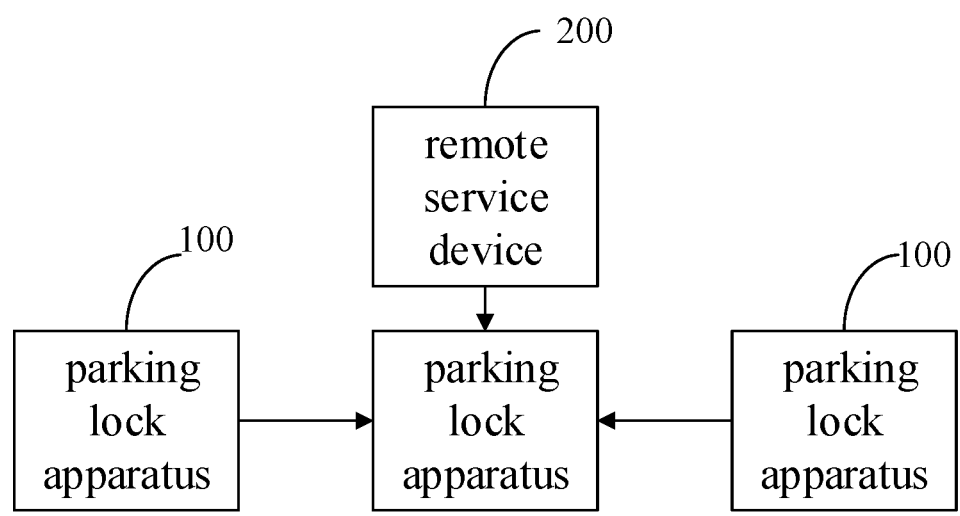
FIG. 15 is a schematic diagram of a parking lock system provided in some embodiments of the present disclosure.

FIG. 15 shows one embodiment of a parking lock system provided in some embodiments of the present disclosure. Referring to FIG. 15, the parking lock system includes at least one parking lock apparatus 100 and a remote service device 200. The parking lock apparatus 100 includes a vehicle identification device and a parking lock controlling device. The vehicle identification device is to identify identity information of a to-be-parked vehicle. The parking lock controlling device is to send an unlocking command to a parking lock according to the identified identity information. In one embodiment, the vehicle identification device may be a device that can identify identity information of vehicles, such as a camera or a scanner. The parking lock controlling device may be implemented as a processor.

The remote service device 200 is in communication connection with the at least one parking lock apparatus 100 in wired or wireless manner. The remote service device 200 is to store a vehicle identity information database, and remotely controls the parking lock apparatus.

Specifically, in one embodiment, the parking lock apparatus may be directly employ the parking lock apparatus of the above embodiment, and a specific implementation structure of the parking lock apparatus has been described in detail in the above embodiments and will not be described in detail herein.

When there are two or more parking lock apparatuses, the parking lock apparatuses may be disposed at parking spaces in a one-to-one manner, and the remote service device may be disposed at a control center.

The parking lock apparatus may realize automatic controlling of the parking lock and automatic charge, thereby realizing unmanned intelligent control and automatic controlling of the parking lock, and saving people for residential parking spaces, company parking spaces, mall parking spaces, and the like.

Embodiments of the present description all are described in a progressive manner, cross-reference may be made to identical or similar portions of the embodiments, and each embodiment focuses on differences from other embodiments.

In the specification provided herein, a plenty of particular details are described. However, it can be appreciated that an embodiment of the invention may be practiced without these particular details. In some embodiments, well known methods, structures and technologies are not illustrated in detail so as not to obscure the understanding of the specification.

Similarly, it shall be appreciated that in order to simplify the disclosure and help the understanding of one or more of all the inventive aspects, in the above description of the exemplary embodiments of the invention, sometimes individual features of the invention are grouped together into a single embodiment, figure or the description thereof. However, the disclosed methods should not be construed as reflecting the following intention, namely, the claimed invention claims more features than those explicitly recited in each claim. More precisely, as reflected in the following claims, an aspect of the invention lies in being less than all the features of individual embodiments disclosed previously. Therefore, the claims complying with a particular implementation are hereby incorporated into the particular implementation, wherein each claim itself acts as an individual embodiment of the invention.

It may be appreciated to those skilled in the art that modules in a device in an embodiment may be changed adaptively and arranged in one or more device different from the embodiment. Modules or units or assemblies may be combined into one module or unit or assembly, and additionally, they may be divided into multiple sub-modules or sub-units or subassemblies. Except that at least some of such features and/or procedures or units are mutually exclusive, all the features disclosed in the specification (including the accompanying claims, abstract and drawings) and all the procedures or units of any method or device disclosed as such may be combined employing any combination. Unless explicitly stated otherwise, each feature disclosed in the specification (including the accompanying claims, abstract and drawings) may be replaced by an alternative feature providing an identical, equal or similar objective.

Furthermore, it can be appreciated to the skilled in the art that although some embodiments described herein include some features and not other features included in other embodiment, a combination of features of different embodiments is indicative of being within the scope of the invention and forming a different embodiment. For example, in the following claims, any one of the claimed embodiments may be used in any combination. Embodiments of the individual components of the invention may be implemented in hardware, or in a software module running on one or more processors, or in a combination thereof.

It is to be noted that the above embodiments illustrate rather than limit the invention, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of an apparatus including several distinct elements. In a unit claim enumerating several elements, several of the elements may be embodied by one and the same item. Use of the words first, second, and third, etc. does not mean any ordering. Such words may be construed as naming.

It will be apparent to those skilled in the art that various modifications and improvements can be made without departing from the spirit of the present invention, which fall within the scope of the present invention. Accordingly, the scope of protection of the present invention should be determined by the appended claims.

What is claimed is:

1. A method for controlling a parking lock apparatus comprising:
   identifying identity information of a to-be-parked vehicle;
   sending an unlocking command to a parking lock according to the identified identity information and enabling the parking lock to be unlocked according to the unlocking command; and
   establishing a communication connection with the to-be-parked vehicle, identifying a running state of the to-be-parked vehicle, sending a locking command to the parking lock when the running state is a closed state, and enabling the parking lock to be locked according to the locking command,
   wherein the enabling the parking lock to be locked according to the locking command includes:
   according to the received locking command, using a distance detection device of the parking lock on the ground to measure a spacing distance between a vehicle chassis of the to-be-parked vehicle and the distance detection device, controlling a lifting height of a lock body of the parking lock according to the spacing distance, and enabling a distance between the vehicle chassis of the to-be-parked vehicle and the distance detection device to reach a preset distance.

2. The method of claim 1, further comprising:
sending a parking fee message to the to-be-parked vehicle when the running state is changed from the closed state to the starting state, sending the unlocking command to the parking lock according to the received parking fee message, and enabling the parking lock to be unlocked according to the unlocking command.

3. The method of claim 2, wherein the closed state is a state in which an engine of the to-be-parked vehicle is closed; and the starting state is a state in which the engine starts.

4. The method of claim 1, wherein before the establishing a communication connection with the to-be-parked vehicle, the method further includes: determining a type of the identity information of the to-be-parked vehicle;
the establishing a communication connection with the to-be-parked vehicle includes: establishing a communication connection with the to-be-parked vehicle when the type of the identity information of the to-be-parked vehicle is a timely charge type.

5. The method of claim 1, wherein the sending an unlocking command to a parking lock according to the identified identity information and enabling the parking lock to be unlocked according to the unlocking command includes:
comparing the identity information of the to-be-parked vehicle with a vehicle identity information database which stores certified identity information of vehicles in advance, sending the unlocking command to the parking lock when the identity information of the to-be-parked vehicle matches one of pieces of certified identity information in the vehicle identity information database, and enabling the parking lock to be unlocked according to the unlocking command.

6. The method of claim 5, wherein the sending the unlocking command to the parking lock when the identity information of the to-be-parked vehicle matches one of pieces of certified identity information in the vehicle identity information database includes:
when the certified identity information includes first identity information and second identity information, sending the unlocking command to the parking lock when the identified identity information is the first identity information and it is in a first time period.

7. The method of claim 6, wherein the first identity information is secondary identity information, and the second identity information is primary identity information; vehicles corresponding to the secondary identity information use the parking lock in a first time period, and vehicles correspond to the primary identity information use the parking lock in any time.

8. The method of claim 6, wherein the sending the unlocking command to the parking lock when the identity information of the to-be-parked vehicle matches one of pieces of certified identity information in the vehicle identity information database includes:
sending the unlocking command to the parking lock when the identified identity information is the second identity information.

9. The method of claim 1, wherein the sending an unlocking command to a parking lock according to the identified identity information and enabling the parking lock to be unlocked according to the unlocking command includes:
sending identity information of the to-be-parked vehicle to a vehicle identity information database, storing the identity information of the to-be-parked vehicle to the vehicle identity information database, sending the unlocking command to the parking lock, and enabling the parking lock to be unlocked according to the unlocking command.

10. A parking lock apparatus comprising:
a vehicle identification device configured to identify identity information of a to-be-parked vehicle;
a communication device configured to establish a communication connection with the to-be-parked vehicle;
a parking lock controlling device configured to identify a running state of the to-be-parked vehicle, send a locking command to the parking lock when the running state is a closed state, and use a distance detection device of the parking lock on the ground to measure a spacing distance between a vehicle chassis of the to-be-parked vehicle and the distance detection device according to the received locking command, control a lifting height of a lock body of the parking lock according to the spacing distance, and enable a distance between the vehicle chassis of the to-be-parked vehicle and the distance detection device to reach a preset distance.

11. The parking lock apparatus of claim 10, wherein the parking lock includes a lock body, a driving device for driving the lock body to move upwardly or downwardly, a control device, and a distance detection device;
the control device is electrically coupled to the distance detection device and the driving device, respectively;
the parking lock controlling device is electrically coupled to the control device and the vehicle identification device, respectively.

12. The parking lock apparatus of claim 11, wherein the distance detection device is on the lock body.

13. The parking lock apparatus of claim 11, wherein the driving device includes a cylinder body disposed on a base, and the distance detection device is disposed at the base.

14. A parking lock system comprising:
at least one parking lock apparatus of claim 10;
a remote service device in communication connection with the at least one parking lock apparatus.

15. A method for controlling a parking lock apparatus comprising:
identifying identity information of a to-be-parked vehicle;
sending an unlocking command to a parking lock according to the identified identity information and enabling the parking lock to be unlocked according to the unlocking command;
establishing a communication connection with the to-be-parked vehicle, identifying a running state of the to-be-parked vehicle, sending a locking command to the parking lock when the running state is a closed state, and enabling the parking lock to be locked according to the locking command; and
sending a parking fee message to the to-be-parked vehicle when the running state is changed from the closed state to the starting state, sending the unlocking command to the parking lock according to the received parking fee message, and enabling the parking lock to be unlocked according to the unlocking command.

* * * * *